(12) United States Patent
Fini et al.

(10) Patent No.: US 8,737,792 B2
(45) Date of Patent: May 27, 2014

(54) MULTICORE FIBERS AND ASSOCIATED STRUCTURES AND TECHNIQUES

(75) Inventors: John M. Fini, Jersey City, NJ (US); Thierry F. Taunay, Bridgewater, NJ (US); Man F. Yan, Berkeley Heights, NJ (US); Benyuan Zhu, Princeton, NJ (US)

(73) Assignee: OFS Fitel, LLC, Norcross, GA (US)

( * ) Notice: Subject to any disclaimer, the term of this patent is extended or adjusted under 35 U.S.C. 154(b) by 396 days.

(21) Appl. No.: 13/045,064

(22) Filed: Mar. 10, 2011

(65) Prior Publication Data
US 2011/0274398 A1     Nov. 10, 2011

Related U.S. Application Data

(60) Provisional application No. 61/312,497, filed on Mar. 10, 2010, provisional application No. 61/314,184, filed on Mar. 16, 2010.

(51) Int. Cl.
*G02B 6/02*     (2006.01)
*G02B 6/036*     (2006.01)

(52) U.S. Cl.
CPC .......... *G02B 6/02042* (2013.01); *G02B 6/0365* (2013.01)
USPC ............................ 385/126; 385/127; 385/128

(58) Field of Classification Search
CPC .................................................. G02B 6/02042
USPC ....................................................... 385/126
See application file for complete search history.

(56) References Cited

U.S. PATENT DOCUMENTS

| 5,742,722 | A | 4/1998 | Imoto | |
|---|---|---|---|---|
| 8,285,094 | B2 * | 10/2012 | Takenaga et al. | 385/100 |
| 8,406,595 | B2 * | 3/2013 | Hayashi | 385/126 |
| 2002/0146226 | A1 | 10/2002 | Davis et al. | |
| 2002/0176677 | A1 * | 11/2002 | Kumar et al. | 385/126 |
| 2006/0010920 | A1 | 1/2006 | Cheo | |
| 2006/0215976 | A1 | 9/2006 | Singh et al. | |
| 2009/0201953 | A1 | 8/2009 | Peyghambarian et al. | |
| 2010/0054742 | A1 | 3/2010 | Imamura | |
| 2011/0052129 | A1 * | 3/2011 | Sasaoka | 385/126 |
| 2012/0087626 | A1 * | 4/2012 | Nagashima et al. | 385/124 |
| 2012/0183304 | A1 * | 7/2012 | Winzer et al. | 398/142 |
| 2013/0183016 | A1 * | 7/2013 | Imamura | 385/127 |
| 2013/0243384 | A1 * | 9/2013 | Matsuo et al. | 385/127 |
| 2013/0294737 | A1 * | 11/2013 | Dianov et al. | 385/127 |

OTHER PUBLICATIONS

Koshiba et al, "Heterogeneous multi-core fibers: proposal and design principle", IEICE Electronics Express, vol. 6, No. 2, 98-103, Jan. 25, 2009.*

* cited by examiner

*Primary Examiner* — Hemang Sanghavi
(74) *Attorney, Agent, or Firm* — Jacobs & Kim LLP

(57) ABSTRACT

A multicore fiber comprises a plurality of cores extending along the length of a fiber body. Each of the cores is surrounded by a cladding. The plurality of cores and surrounding cladding provide respective index variations, so as to form a respective plurality of waveguides for conducting parallel data transmissions from a first end of the fiber to a second end. The plurality of cores has a cross-sectional geometry in which the plurality of cores is configured in a polygonal array, in which at least some of the cores are positioned at the vertices of the array. The polygonal array is configured such that neighboring cores in the array are separated from each other by a distance that is sufficient to prevent crosstalk therebetween.

21 Claims, 15 Drawing Sheets

30
Table: MCF Specifications

| Coating Outer Diameter | 250μm |
|---|---|
| Cladding Outer Diameter | 130μm |
| Core Diameter | 8μm |
| Core-to-Core Pitch | 38μm |
| Measured Cutoff Wavelength | 1200nm |
| Modefield Diameter @1310nm / @1490nm | 8.3μm / 9.3μm |
| Core Index Difference Δn | 0.0046 |
| Δn of Cladding around Core | −0.0012 |
| Core-Clad Index Difference | 0.0058 |
| Dispersion @1490nm | 10.5 ps/nm-km |
| Dispersion Slope @1490nm | 0.059 ps/nm$^2$-km |

100

Table 1. Crosstalk Characteristics

| Core # | Crosstalk 1310 nm (dB) | Crosstalk 1490 nm (dB) |
|---|---|---|
| Outer core 1 | −38.0 | −24.0 |
| Outer core 2 | −39.8 | −25.5 |
| Outer core 3 | −39.1 | −24.7 |
| Outer core 4 | −40.2 | −25.4 |
| Outer core 5 | −38.3 | −24.0 |
| Outer core 6 | −38.5 | −25.1 |

MULTICORE FIBERS AND ASSOCIATED STRUCTURES AND TECHNIQUES

CROSS REFERENCE TO RELATED APPLICATIONS

The present application claims the priority benefit of the following United States provisional patent applications, which are owned by the assignee of the present application, and which are incorporated herein by reference in their entirety:

U.S. Prov. Pat. App. Ser. No. 61/314,184, filed on Mar. 16, 2010; and

U.S. Prov. Pat. App. Ser. No. 61/312,497, filed on Mar. 10, 2010.

BACKGROUND OF THE INVENTION

1. Field of the Invention

The present invention relates generally to multicore optical fiber designs, devices, and applications.

2. Background Art

Passive optical networks (PONs) are now being deployed worldwide in large numbers for broadband access services. The rapid growth in data traffic has recently led to an exponentially growing demand for capacity in access networks. This growing demand has in turn driven an increasing need for high counts of feeder fibers, causing congestion problems in duct pipes, and like structures. Hence, low-cost, high-density cables with high fiber counts are necessary to construct practical PON systems for future optical access networks. Similar needs exist for increasing the capacity of long-haul, backbone networks, as bandwidth continues to grow unabated while technological solutions for providing such bandwidth appear to be saturating.

Multicore fiber (MCF) offers a possible solution for increasing fiber density, spectral efficiency per fiber, and for overcoming cable size limitations and duct congestion problems. The goal of multicore fiber solutions, and spatial division multiplexing in general, is to increase the bandwidth capacity of a communication link at a rate greater than the increase in cost of conventional solutions. In other words, a system which increases capacity by a factor N using spatial division multiplexing will be commercially interesting if the cost is significantly less than N times the cost of deploying conventional single-spatial-mode solutions.

Design and fabrication of several types of MCFs have been reported to address this need for high density while maintaining properties similar to those of single-core solutions, such as low loss, low crosstalk and facile connectivity. The crosstalk level, i.e. the power transferred between the cores, is determined by the refractive index profiles of the cores and surrounding cladding, as well as the core-to-core distance and the physical layout of the fiber (e.g., bends, twists, strains, and the like). The core density is dictated by the core-to-core distance and geometrical arrangement of the multiple cores. The index profile, core geometry, and coating also affect microbend and macrobend loss, as well as the nonlinear properties of the fiber. Therefore, a comprehensive design is necessary to optimize overall optical fiber parameters for MCF. Another important problem is connectivity: commercial use of MCF requires low-cost reliable splicing and coupling of signals into and out of the closely-spaced individual cores.

In addition, the demand for ever higher capacity data transmissions has attracted considerable interest in the development of high-density and high-speed parallel optical data links for a wide range of applications including interne switches, servers, future high performance computers and data centers. A low-crosstalk and low-loss fiber device that enables coupling to individual cores is important for parallel MCF transmissions.

In the case of internet switches, the increase of fiber bandwidth using DWDM technology leads to aggregate bandwidths in excess of 1 terabit per second (Tb/s). In addition, system size has increased from single-shelf to multi-rack configurations. Intrasystem, rack-to-rack interconnections can span a range of several meters to tens meters. The task of providing and managing hundreds of individual links using either copper-based or conventional fiber cables is becoming increasingly challenging.

In high performance super-computers and data centers, thousands to tens of thousands of optical links operating at 1 Gb/s up to 10 Gb/s may be present. The longest distances for multichannel parallel links in such systems are typically less than 100 m. The key requirements for ensuring successful deployment of high-density parallel optical data links in that context include low cost, high density, rapid installation, and low power consumption. The majority of work to date has focused on one-dimensional parallel optical data links, which utilize multimode fiber ribbons with a one-data-channel-per-fiber arrangement. Such fiber ribbons typically comprise a 1×12 linear array of multimode fibers on a 250 µm pitch. However, such a system configuration is costly, complicated and bulky.

SUMMARY OF THE INVENTION

An aspect of the invention provides a multicore fiber, comprising a plurality of cores extending along the length of a fiber body. Each of the cores is surrounded by a cladding. The plurality of cores and surrounding cladding provide respective index variations, so as to form a respective plurality of waveguides for conducting parallel data transmissions from a first end of the fiber to a second end. The plurality of cores has a cross-sectional geometry in which the plurality of cores is configured in a polygonal array, in which at least some of the cores are positioned at the vertices of the array. The polygonal array is configured such that neighboring cores in the array are separated from each other by a distance that is sufficient to prevent crosstalk therebetween. The separation may be uniform, or non-uniform, and the pattern may or may not be polygonal but may have other forms of symmetry, such as radial.

Further aspects of the invention provide single-mode and multimode multicore fibers. In one practice of the invention, the plurality of cores is arranged in an array with a hexagonal shape, with individual cores positioned at respective vertices of the hexagon.

BRIEF DESCRIPTION OF THE DRAWINGS

FIG. 10 shows a table setting forth the measured crosstalk, after 11.3 km, between the six outer cores and the center core in an exemplary multicore fiber.

DETAILED DESCRIPTION

Figure 1:
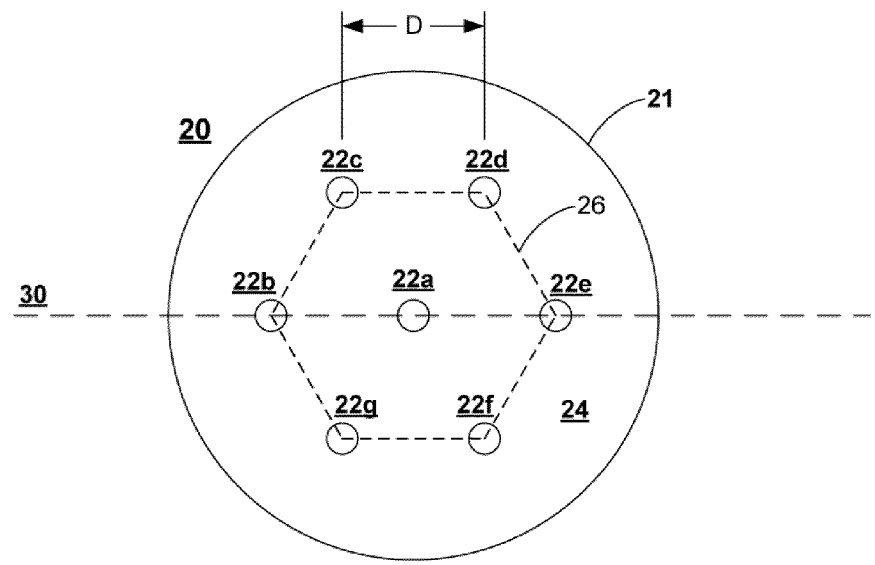
FIGS. 1 and 2 show, respectively, cross section and isometric diagrams of an exemplary multicore fiber according to an aspect of the invention.

Aspects of the present invention are addressed to multicore fibers and associated structures and techniques. The present description is divided into two sections.

The first section relates to a 7-core single-mode multicore fiber, as described in U.S. Provisional Patent Application Ser. No. 61/314,184, filed on Mar. 16, 2010. The second section relates to a 7-core graded-index multimode multicore fiber, as described in U.S. Provisional Patent Application Ser. No. 61/312,497, filed on Mar. 10, 2010. Both of these applications have been assigned to the assignee of the present application, and incorporated herein by reference in their entirety.

The following discussion is organized as follows:

I. Multicore Fiber I
A. Introduction
B. Fiber Design
II. Multicore Fiber II
A. Introduction
B. Fiber Design
C. High-Speed Parallel Transmission
III. Conclusion I. Multicore Fiber I A. Introduction There is described in Section I an exemplary multicore fiber (MCF), with seven single-mode cores arranged in a hexagonal array. The MCF is designed and fabricated for construction of high-density, high-count optical fiber cables, which can be used in, for example, optical access networks, core networks, and other applications requiring multichannel parallel transmission at distances ranging in the 10's and 100's of kilometers, or even longer. The described MCF can also be used at longer distances. Depending upon the transmission distance, it may be necessary to provide amplification. An amplification system for an MCF transmission system is described in U.S. Prov. Pat. App. Ser. No. 61/314,181, which is owned by the assignee of the present application, and which is incorporated herein by reference in its entirety.

Using the described design, it is possible to construct a low-crosstalk multicore fiber having a diameter that is substantially equal to, and compatible with, that of currently used standard single-mode, single-core fibers. As used herein, the term "compatible" means that conventional and well-established methods for cleaving, fusion splicing and connectorizing standard single-core fibers can also be used with multicore fibers. Furthermore, such multicore fiber can also be used in conventional cable design with relatively little modification of cable design. For a range of applications, fibers with diameter larger and smaller than 125 μM have been developed and are now standard. This includes thin fibers with 80 μm glass diameter as well as fibers as large as 200 μm, or even 400 μm. Thus, it is possible to incorporate the described fiber into already existing physical structures, such as duct pipes and the like, used in current optical fiber transmission links, with similar installation and maintenance protocols.

Described herein are the properties of the exemplary MCF, including crosstalk, attenuation and splice loss characteristics. Further described in this section are: a low-crosstalk, low-loss tapered multicore connector (TMC) for coupling individual signals into and out of the MCF; and a network configuration in which the described MCF and TMC are used in a passive optical network (PON). According to a further aspect of the invention, MCF parallel transmissions are used in a PON to increase fiber density and to increase the number of optical network end users at the subscribers' premises.

By using the described structures and techniques, it has been possible to demonstrate, in an exemplary PON, simultaneous transmissions of 1310 nm and 1490 nm digital signals at 2.5 Gb/s over 11.3-km of 7-core MCF with a split ratio of 1:64. Thus, in the present example, the described PON can serve a total of 448 end-users at the subscriber premises from a single fiber.

B. Fiber Design

Figure 2:
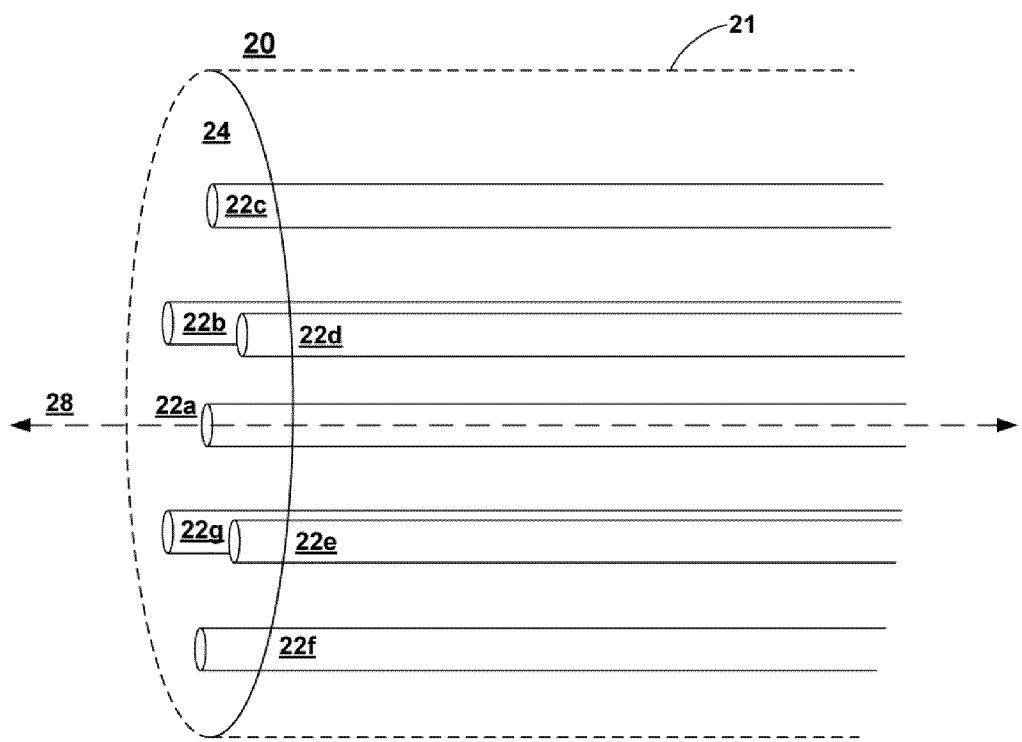

FIGS. 1 and 2 show, respectively, cross section and isometric diagrams of an exemplary MCF 20 according to an aspect of the invention. MCF 20 comprises a plurality of cores 22a-g extending along the length of a fiber body 21. Each of the cores is surrounded by a cladding 24. The plurality of cores 22a-g and surrounding cladding 24 provide respective index variations, so as to form a respective plurality of waveguides for conducting parallel data transmissions from a first end of the fiber to a second end. The plurality of cores 22a-g has a cross sectional geometry in which the plurality of cores are configured in a polygonal array, in which at least some of the cores 22b-g are positioned at the vertices of a polygon 26. As described below, neighboring cores in the plurality of cores are separated from each other by a distance D that is sufficient to maintain an acceptably low level of crosstalk therebetween. The spacing D may be uniform and constant within a certain tolerance, or it may vary intentionally between various pairs of cores. Such variation may be desired and useful to manage intra-core effects, such as crosstalk and optical attenuation, as described below.

MCF 20 can be fabricated, for example, using a "stack-and-draw" technique. A preform assembly is formed from a plurality of core rods and filler rods which fill the gaps between and around the core rods. The preform assembly may be collapsed into a fully-solid structure (or interstitial holes may remain in the structure intentionally) and drawn into a multicore fiber, wherein the core rods correspond to the fiber cores, and the filler rods correspond to the cladding.

The core rods are typically doped with suitable index-modifying elements to achieve a desired refractive index profile. The filler rods may be fabricated from an undoped material, such as plain silica ($SiO_2$). Alternatively, it may be desired for at least some of the filler rods to be doped to achieve a different cladding refractive index around one or more of the cores. Further, the preform assembly may include other structures, including capillary tubes, substrate tubes, or the like. The refractive index of each fiber region is expressed as an index difference Δn, i.e., the difference between the region's refractive index and that of undoped cladding.

Figures 3, 4:
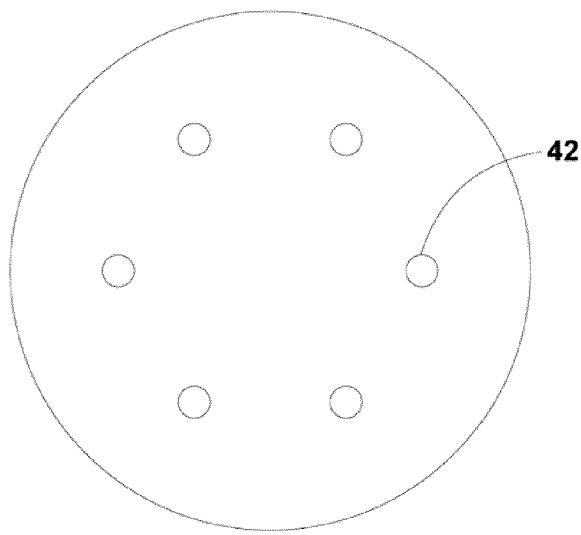
FIG. 3 shows a table setting forth exemplary specifications for the multicore fiber shown in FIGS. 1 and 2.
FIG. 4 shows a cross section diagram of a multicore fiber according to a further aspect of the invention.

FIG. 3 shows a table 30 setting forth exemplary specifications for MCF 20, which is configured for single-mode operation in the 1310 nm and 1490 nm regions. MCF 20 comprises seven cores 22a-g, each having a nominal diameter of 8 μm. A center core 22a is positioned at the center of six outer cores 22b-g that are arranged at the vertices of a regular hexagon 26, with a core-to-core pitch of 38 μm. The outer diameter of the glass cladding 24 is 130 μm. MCF 20 further includes an acrylate dual coating (not shown), having an outer diameter of 250 μm. The measured cutoff wavelength for each core is approximately 1200 nm, and modefield diameters (MFD) at 1300 nm and 1490 nm are approximately 8.3 μm and 9.3 μm respectively.

It should be noted that, according to a further aspect of the invention, the fiber may comprise fewer than seven cores, or more than 7 cores. For example, it would be possible to omit the center core, in order to provide 6 channels instead of 7. FIG. 4 shows a cross section diagram of a fiber 40 with such a configuration. Similar to MCF 20 (FIGS. 1-3). MCF 40 includes six cores 42 positioned at the vertices of a hexagon. However, no center core is provided. It would also be possible to employ a core configuration having a different shape, e.g., rectangular.

Returning to MCF 20 (FIGS. 1-3), each individual core 20a-g has an index difference Δn of approximately 0.0046 surrounded by a cladding region having a Δn of –0.0012 relative to the outermost cladding, resulting in a core-clad index difference $n_{core} - n_{clad} \approx 0.0058$. Note that in this design, the cladding adjacent to the core comprises a refractive index "trench." All of the individual MCF cores have the same, or substantially equal, dispersion and dispersion slope values. At 1490 nm, the dispersion is approximately 10.5 ps/nm-km, and the dispersion slope is approximately 0.059 ps/nm²-km. Similarly, the cores have substantially equal modefield size and shape, effective nonlinear properties, and propagation constants.

Figures 5, 6:
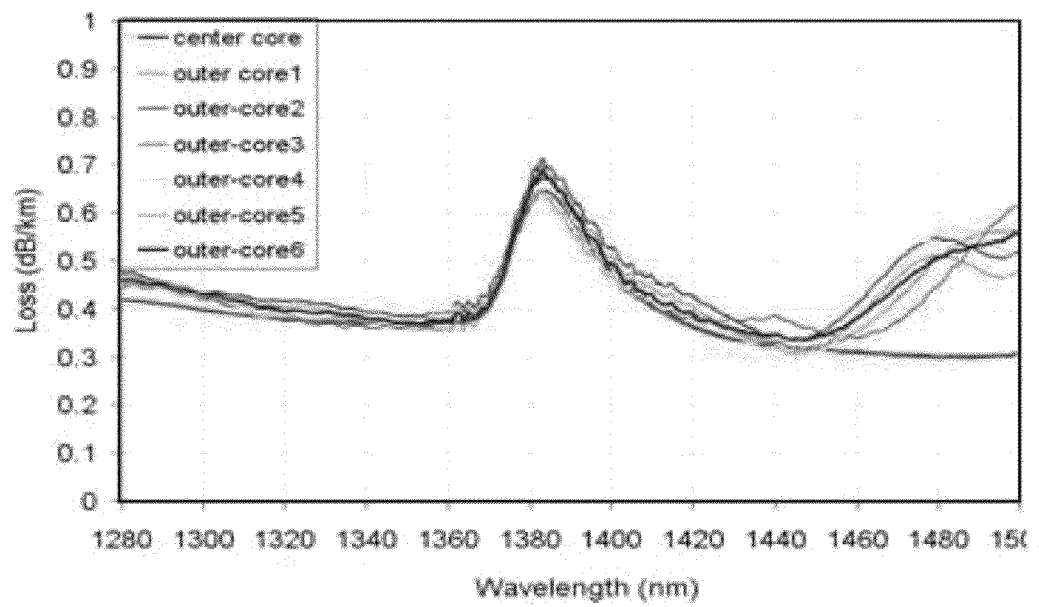
FIG. 5 shows a graph illustrating attenuation spectra, measured using a cutback technique, of a sample of the multicore fiber shown in FIGS. 1 and 2.
FIG. 6 shows a table comparing attenuation for the center core and outer cores of the multicore fiber shown in FIGS. 1 and 2 and a standard single-mode fiber.

FIG. 5 shows a graph 50 illustrating the attenuation spectra, measured using a cutback technique, of a sample of the MCF having a length of 11.3 km.

FIG. 6 shows a table 60 comparing the attenuation for the center core 24, the outer cores 22, and a standard single-mode fiber (SSMF).

As shown in table 60, at 1310 nm, the center core 22 has a measured attenuation of 0.39 dB/km. At 1490 nm, the center core has a measured attenuation of 0.30 dB/km. At 1310 nm, the average loss for the 6 outer cores 24 is 0.41 dB/km. At 1490 nm, the average loss is 0.53 dB/km.

As further shown in table 60, the center core loss at 1310 nm and 1490 nm and the outer core loss at the shorter wavelength (i.e., 1310 nm) may be considered comparable to the loss in a conventional standard single-mode fiber (SSMF) in that the spectral shape of the loss curve has well-known features, including: a hydroxyl overtone around 1380 nm; a loss component which decreases with wavelength and which may be attributed to Rayleigh scattering; and an approximately wavelength independent component which may be attributed to scattering and contamination. As described below, this latter component may be reduced using improved fiber design and fabrication methods. At 1310 nm and 1490 nm, the losses of conventional SSMF are approximately 0.35 dB/km and 0.24 dB/km, respectively. A notable feature of FIG. 5 is that the MCF outer core loss at 1490 nm is higher than the loss in the other cores. There are a number of reasons for this higher loss, including microbend loss and tunneling loss interactions with the coating at close proximity, e.g., core-coating effective index matching. The outer core loss at the longer wavelength can be reduced in a number of ways, as discussed in greater detail below.

The tunneling loss was calculated using a two-dimensional finite difference vector model solver using a perfectly matched non-reflecting boundary layer. This tunneling loss introduces an excess attenuation in the outer cores above that in the center core.

Figure 7:
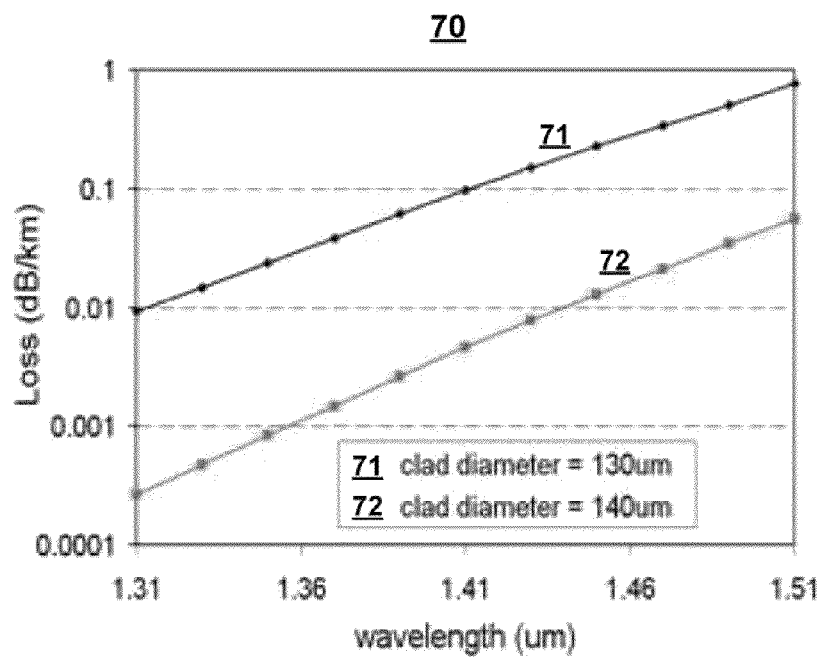
FIG. 7 shows a graph illustrating the calculated tunneling and macrobend losses for a 130 μm clad diameter multicore fiber.

FIG. 7 shows a graph 70 illustrating the calculated tunneling and macrobend losses (with the fiber bent in a 15 cm diameter coil) for the 130 μm clad diameter fiber (plot 71) in which the outer core centers are 27 μm from the coating. The reduction in loss is comparable to the measured excess loss. Thus, FIG. 7 indicates that the tunneling loss can be reduced to a negligible level by increasing the fiber clad diameter to 140 μm (plot 72), such that the outer core centers will be ~32 μm from the coating, while keeping the same 38 μm core pitch.

The mechanism responsible for tunneling loss is coupling of the signal in the outer cores to cladding and coating modes. In general, one main strategy for reducing excess long-wavelength loss is to reduce the modefield present at some feature relevant to the loss mechanism. For example, as the evanescent tail and optical field strength are made smaller at the feature, there is a reduction of absorption and scattering due to overlap of that tail with any absorbing or scattering materials (such as the polymer coating). There may also be a reduction in coupling between the core modes and modes supported by the cladding or coating. Because perturbations to the fiber such as bending, twisting and heating are known to modify the effective refractive index profile, the treatment of the overlap of the modefield distribution with fiber features must also consider such perturbations. In specific examples, loss may be calculated for a specific perturbation, such as bending, but mode-field confining strategies that reduce such mechanisms typically also reduce other sources of loss, such as absorption and scattering.

Other strategies for controlling optical attenuation may be invoked, depending on the loss mechanism. For example, enforcing limitations on bending of the fiber, such as limiting the minimum bend radius experienced in the cable in a deployed fiber, or reducing the refractive index of the polymer coating or some cladding feature can control the characteristics of the modefield distribution. A thicker coating or improved mechanical properties of the coating which reduce stress on the fiber can reduce microbending loss.

Figure 8:
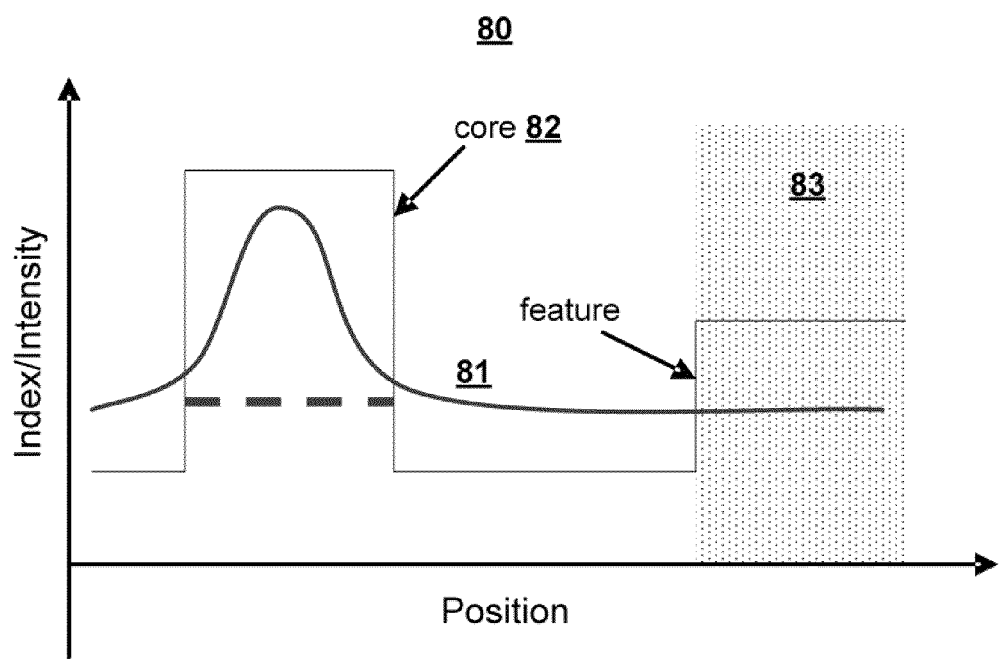
FIG. 8 shows a graph illustrating an exemplary modefield guided by a core.

FIG. 8 shows a graph 80, illustrating that the modefield (trace 81) guided by a core 82 has an evanescent tail penetrating into the cladding (stippled area 83). Since the modefield distribution typically has wider radial extent at longer wavelengths, losses due to tunneling often increase at longer wavelength. This is observed in FIG. 6, discussed above.

An additional source of optical attenuation arises from contamination introduced during the core rod and fiber fabrication process. Not shown in FIG. 8 is the interface between the core rod and the cladding materials used to assemble the MCF preform in a stack-and-draw process. Because the optical modefield overlaps with these interfaces, contamination can induce absorption and scattering.

Optical crosstalk between adjacent cores is a significant issue in the design of a multicore fiber. Crosstalk is strongly influenced by the spatial distribution of the optical modefields guided by the cores. The optical crosstalk from the center core to adjacent outer cores in the exemplary MCF 20 was measured by using 1 meter of SSMF to scan the optical power intensity distributions at the output endface of the fiber.

A MCF with 11.3-km length was wound onto a 28 cm-diameter spool, and the center core 22 was spliced to 1-meter of SSMF launching 1310 nm and 1490 nm signals. The amount of crosstalk was determined from the ratio of optical power detected at the 6 outer cores to the optical power detected at the center core the end of the 11.3 km MCF.

Figure 9:
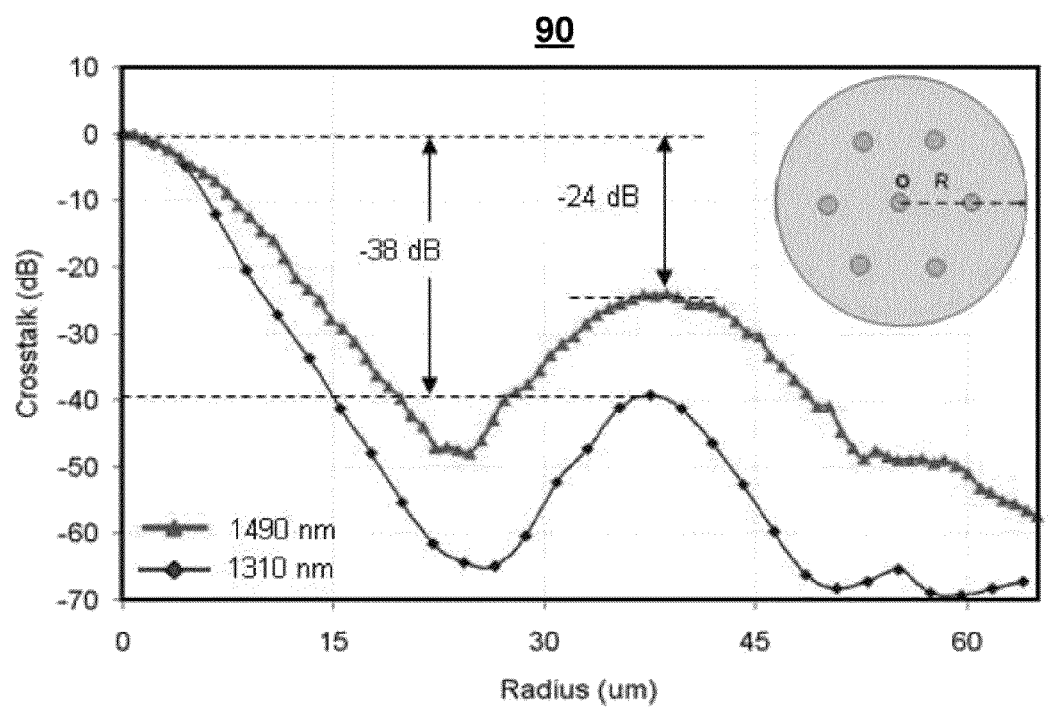
FIG. 9 shows a graph illustrating optical power distribution vs. radius in an exemplary multicore fiber.

FIG. 9 shows a graph 90 illustrating optical power distribution vs. radius in an exemplary MCF. The local maximum crosstalk occurs at about 38 μm radial position, i.e., at the center of the adjacent core.

FIG. 10 shows a table 100 setting forth the measured crosstalk between the six outer cores and the center core after 11.3 km. Maximum crosstalk is less than −38 dB at 1310 nm, and less than −24 dB at 1490 nm, consistent with the expected increased evanescent penetration through the cladding at longer wavelengths, where the mode effective index is smaller, and MFD is larger.

It should be noted that, when all seven cores carry signals simultaneously, the worst-case crosstalk, compared with the case of signal transmission through one core, would be 6× for the center core and 3× for the outer cores. The 6× and 3× multipliers are based upon the number of immediately adjacent cores. It should also be noted that the crosstalk characteristics of a given MCF depend not only on fiber design (e.g., index profile, core diameter, core-pitch and the like) but also on fiber length and the layout (e.g., bends, twists, and the like) along a given optical link.

Better confinement of the modefield to reduce attenuation and crosstalk can be implemented in several ways: The distance ($d_{core}$-feature) between the center core and the relevant feature (other core, polymer, core rod interface etc) can be increased. For example, losses due to the coating can be reduced my making the coating farther from the core, or the radius of the core rod relative to the core radius can be increased, or the core-to-core spacing can be increased. Alternatively, the index profile of the core and cladding can be arranged to provide tighter confinement of the core, for example, by raising the index in all or part of the core, lowering the index in all or part of the cladding (for example adding a trench), or both.

Improving mode confinement typically makes the modefield diameter smaller, and this is an important tradeoff. While fibers with modefield diameters larger than that of a standard single-mode fiber may have other advantages (e.g., low non-linearity, lower connection losses), fibers with relatively small modefield diameters may be desirable for reducing long-wavelength losses and increasing the packing density of the cores.

In addition to modefield diameter, an important metric of mode confinement is the parameter $\kappa=(n_{eff}^2-n_{clad}^2)^{1/2}$ where $n_{eff}$ is the effective index of a mode and $n_{clad}$ is the index of the cladding. Intensity in the tail falls with position x from the core center as $e^{-2\kappa x}$, and so fibers with a large $\kappa$ will show reduced long-wavelength loss.

Figure 11:
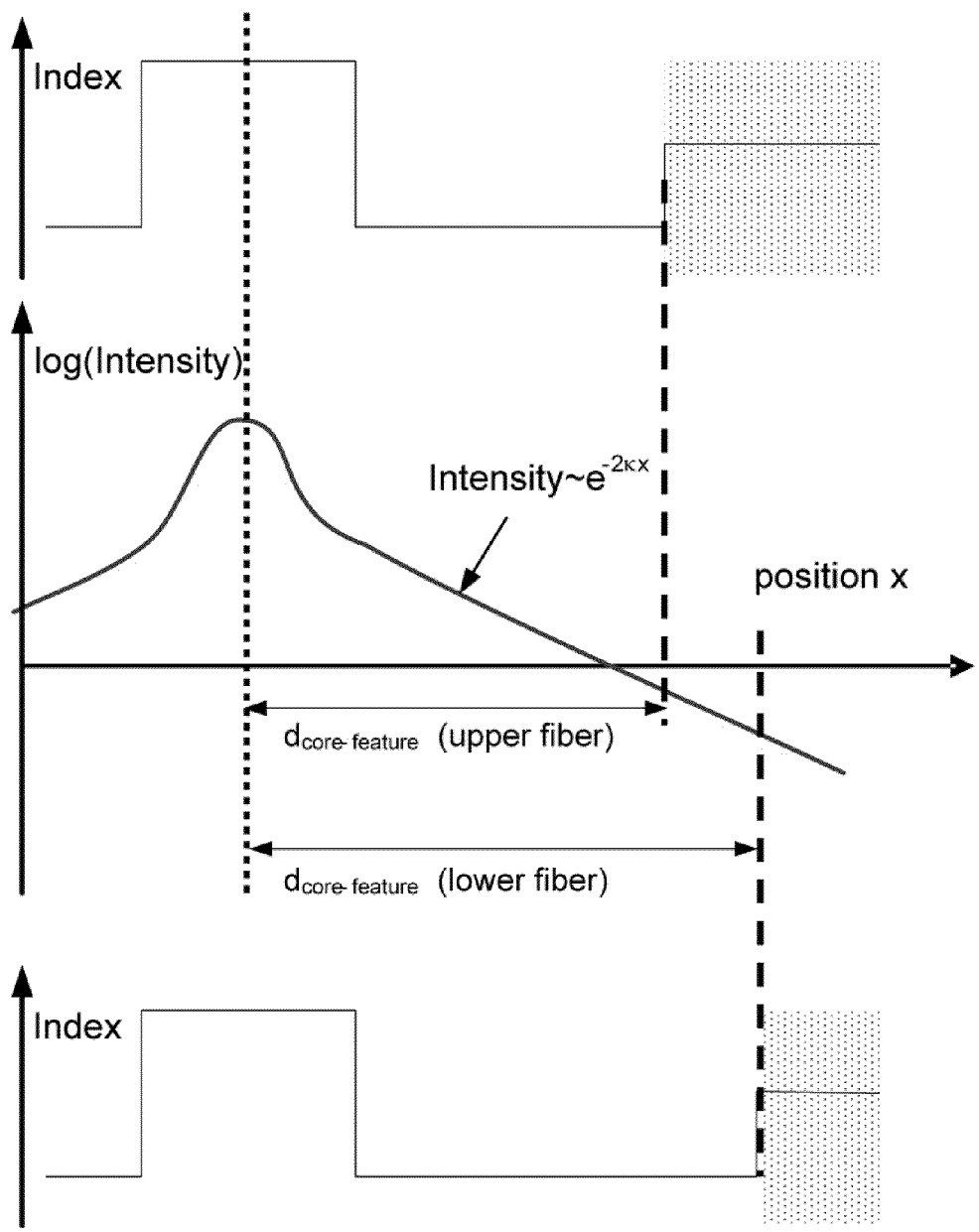
FIG. 11 shows a composite graph illustrating the effect of increasing the distance between core and a loss-inducing feature.

FIG. 11 shows a composite graph 110 illustrating the effect that increasing the distance between core and a loss-inducing feature reduces the modefield at the feature. The reduction of evanescent fields needed for reducing excess loss is similar to the reduction of evanescent fields accomplished in many low-bend-loss, or so-called bend insensitive, designs. Thus the use of a low-index annular trench in the cladding surrounding a core may be highly desirable, and would entail a tradeoff between cutoff, mode size (MFD or $A_{eff}$), and long-wavelength loss very similar to the tradeoff between cutoff, mode size, and bend loss in current bend-insensitive fibers such as those conforming to ITU specification G.657.

Desirable index profiles for an outer core of a multicore fiber would include the inner portions (excluding the outer trench) of the fibers, or fibers generally with a trench region with index below around −7×10⁻³ relative to the cladding index.

Figure 12:
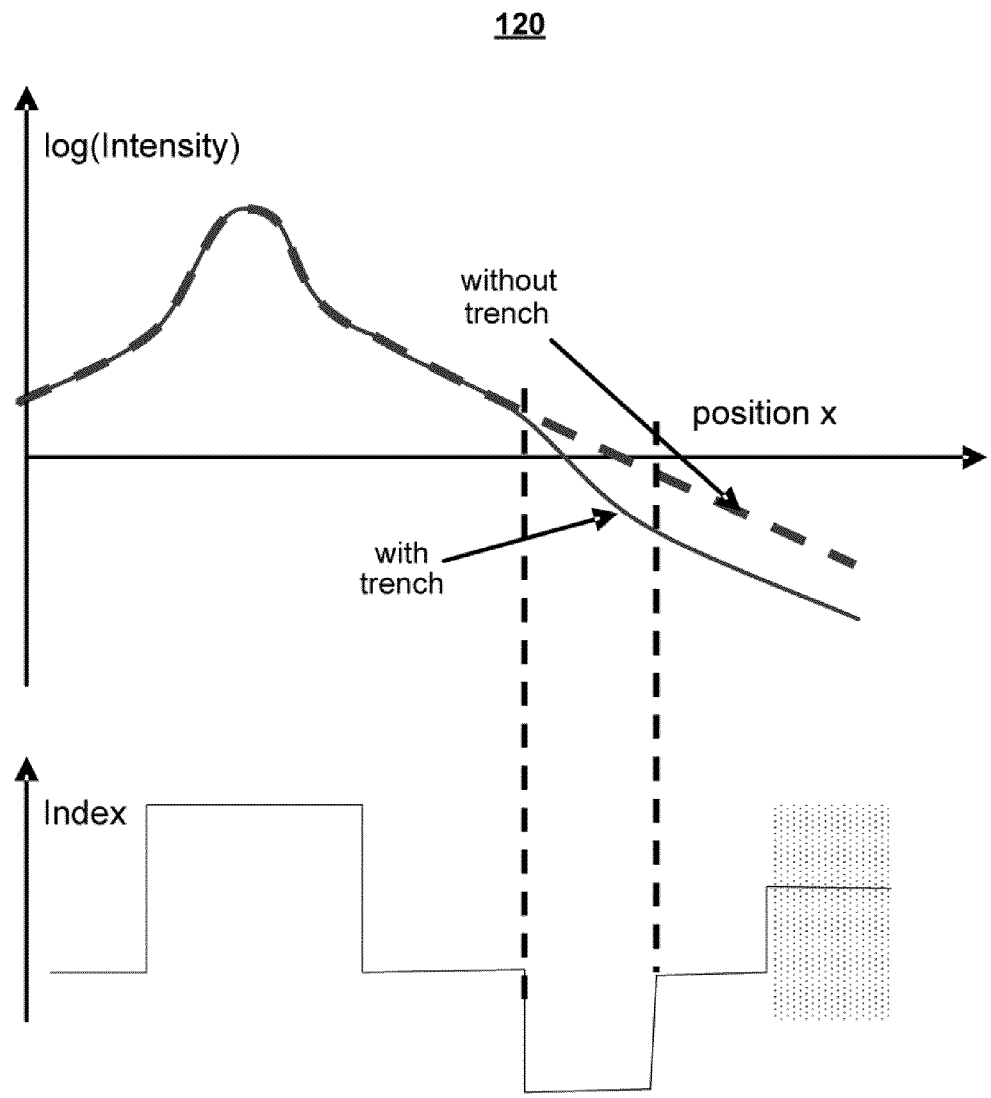
FIG. 12 is a composite graph illustrating how trenches reduce the tail of an exemplary modefield.

FIG. 12 is a composite graph illustrating how trenches reduce the tail of the modefield. While the long-wavelength loss is in many ways analogous to the bend loss of a single-core fiber, or the crosstalk of a multicore fiber (all roughly proportional to the strength of the evanescent tail of the guided mode at some relevant location outside the core), the long-wavelength loss is different in that it primarily impacts the outermost cores of a multicore fiber.

Thus several approaches may be desirable to control the distribution of the optical modefield:

Use refractive index profiles which provide greater optical confinement for the cores with greatest overlap with undesirable features, possibly at the expense of higher cutoff, higher cost, or smaller mode size for these cores.

Using lower-index materials in the tail region of the modefield, for example in between the assembled core elements.

Use an additional low-index layer between the outer glass surface of the fiber (the coating interface). For example, this could be a single annular down-doped region or an air-clad region surrounding all of the cores. This should be balanced with multi-path interference and other impairments related to guiding of unwanted modes or supermodes in the cladding.

Figure 13:
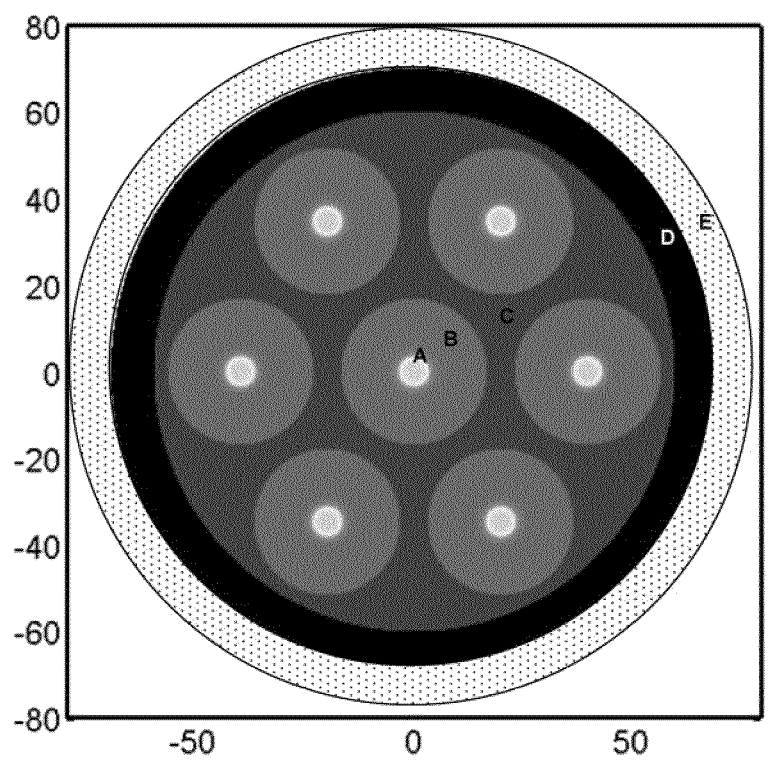
FIG. 13 shows a diagram illustrating the use of a down-doped material in a region between the outer cores and coating in an exemplary multicore fiber.

FIG. 13 shows a diagram illustrating the use of a down-doped material in region D between the outer cores and the coating E. Low index D will effectively truncate the modefield distribution, reducing overlap with the coating or material which surrounds region D.

Figure 14:
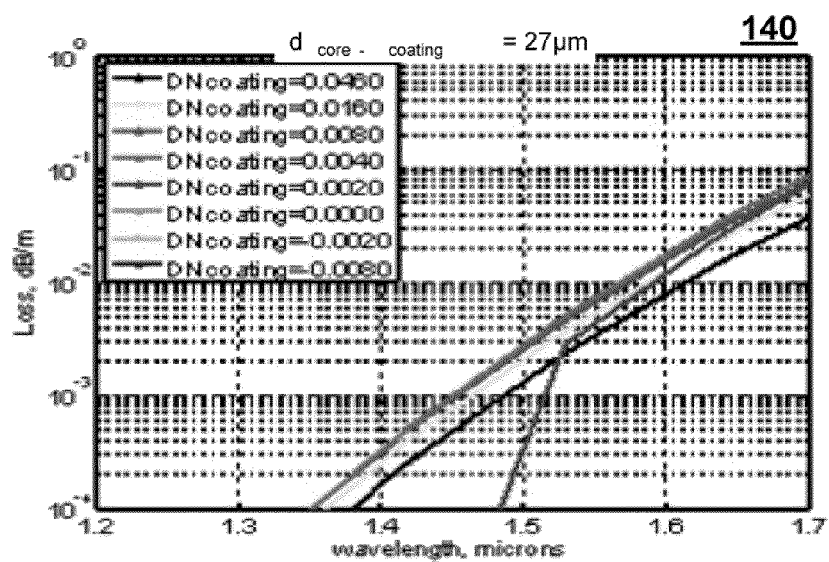
FIGS. 14-16 show a series of graphs illustrating a calculation showing the ability to reduce tunneling loss by increasing the distance between a core and a coating interface.
Figure 15:
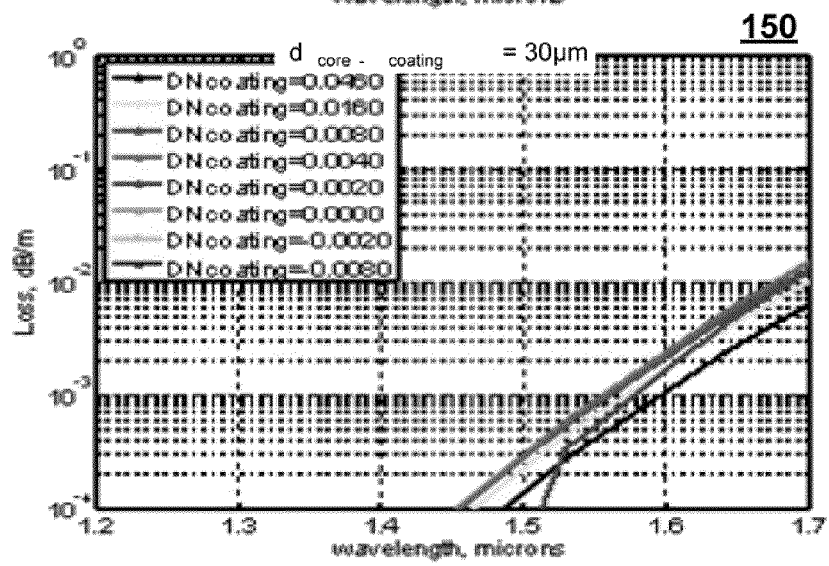
Figure 16:
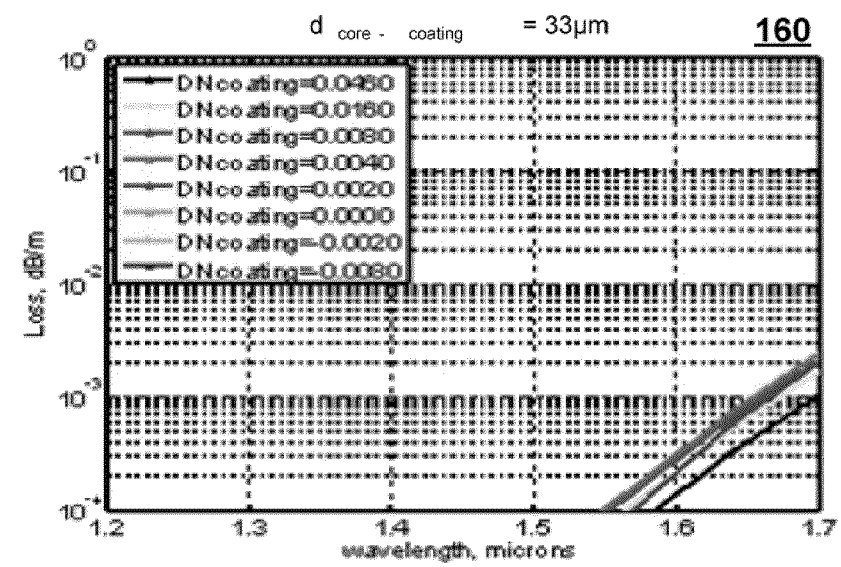

FIGS. 14-16 are a series of graphs 140, 150, 160, illustrating a calculation showing the ability to reduce tunneling loss by increasing the distance between a core and the coating interface. Also shown is the dependence on the relative index between the coating and the glass cladding. In this example, coating index less than around 0.002 above the cladding index results in effectively no tunneling (curves not visible where losses are off scale). Therefore, use of a coating with appropriate index below or approximately equal to the cladding index prevents excess loss. Use of a coating with sufficiently high index (e.g. approximately equal to the cladding index) will further reduce impairments due to unwanted modes by causing their preferential attenuation, which may be desirable. Note that treatment of the coating index should also include temperature effects which may be significant for practical fiber and cable installations due to the high value of dn/dT for polymers relative to silica-based materials.

Further simulations for a structure with two or three different cladding index values are illustrated in FIGS. 14-16.

Figure 17:
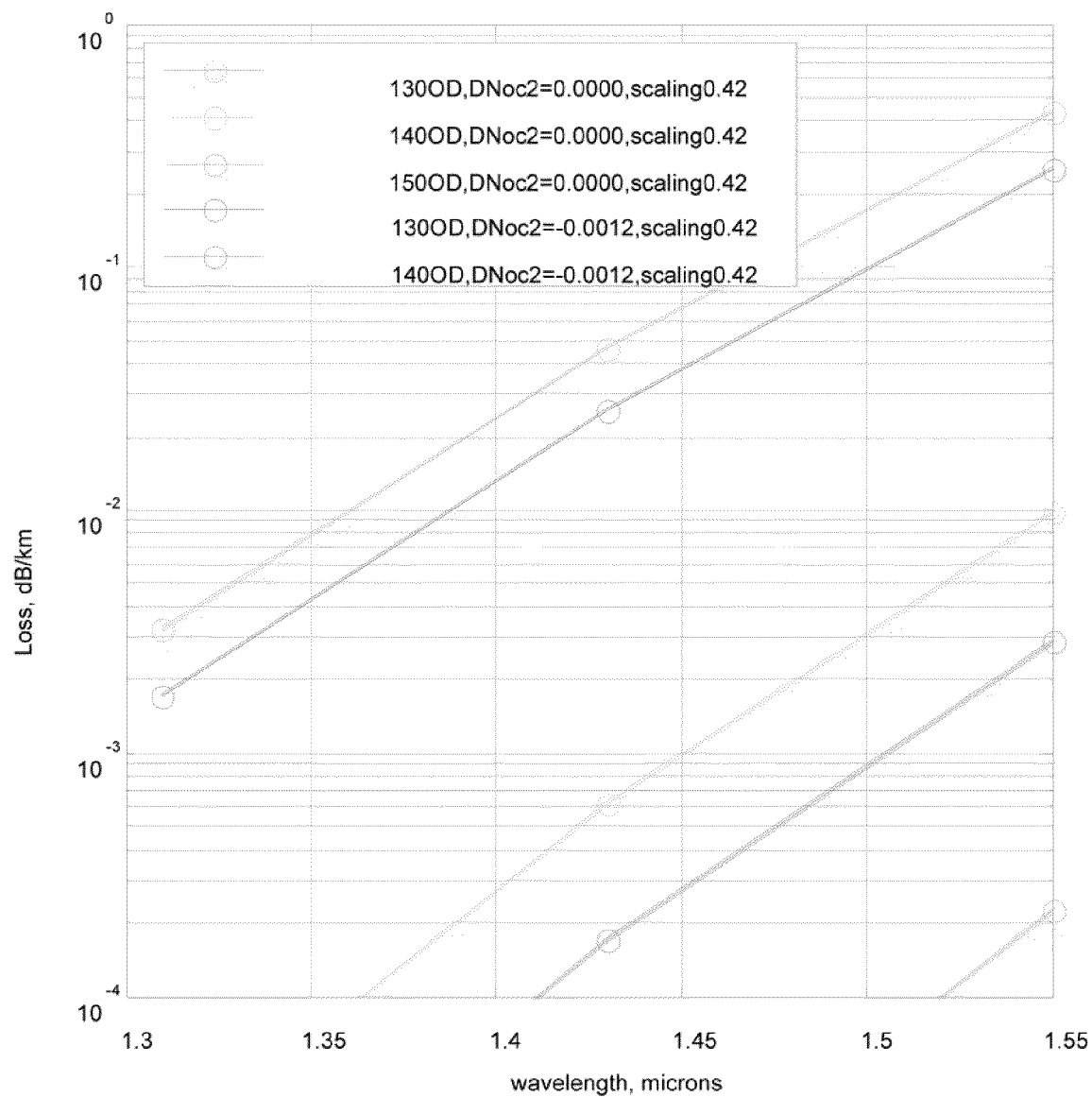
FIG. 17 shows a graph comparing simulations for several designs, all using the same core rods with the same core size and shape and core spacing.

FIG. 17 shows a graph 170, comparing simulations for several designs, all using the same core rods (regions A and B in FIG. 13, standard SMF) with the same core size and shape and core spacing (40 μm). The intermediate region between core rods, C, is slightly down-doped (Δn~−0.0012 relative to pure silica) with a first F320 overclad of each core rod to reduce evanescent field tails beyond the material of the core rod.

The FIG. 17 graph 170 illustrates the effect of the index and thickness of region D in FIG. 13. Large thickness but matched index between regions C and D drastically reduces tunneling loss, but results in larger fiber outer diameter. Modest index reduction of region D gives modest loss reduction.

II. Multicore Fiber II

A. Introduction

There is described in Section II a graded-index multicore fiber and related structures and techniques for use in the types of long or medium distance applications described above as well as super computers, data centers, and other applications requiring high-speed parallel transmissions at shorter transmission lengths (e.g., on the order of 100 m).

One of the promising solutions for high density parallel optical data links is to use the multicore fiber (MCF) design described hereinbelow, which is butt-coupled with 2-dimensional VCSEL and PiN photo detector arrays to realize MCF transmissions. A two-channel simultaneous transmission over a 2×2 MCF using direct coupling with a linear VCSEL array at <1-Gb/s has been reported.

For the purposes of laboratory testing, due to the cost of 2-D VCSEL arrays, a parallel high-speed MCF transmission was conducted using tapered multicore connectors (TMC) for coupling of the signals into and out of a sample MCF. Commercially available VCSELs were used as the transmitters, and commercially available PiNs were used as the receivers. As described below, using the described structures and techniques, it is possible to demonstrate 10-Gb/s per channel (core) simultaneous transmissions in all seven cores over 100 meter using tapered multicore connectors and 850-nm VCSELs, thereby demonstrating a high-speed multicore fiber transmission for parallel optical data links.

B. Fiber Design

Figure 18A:
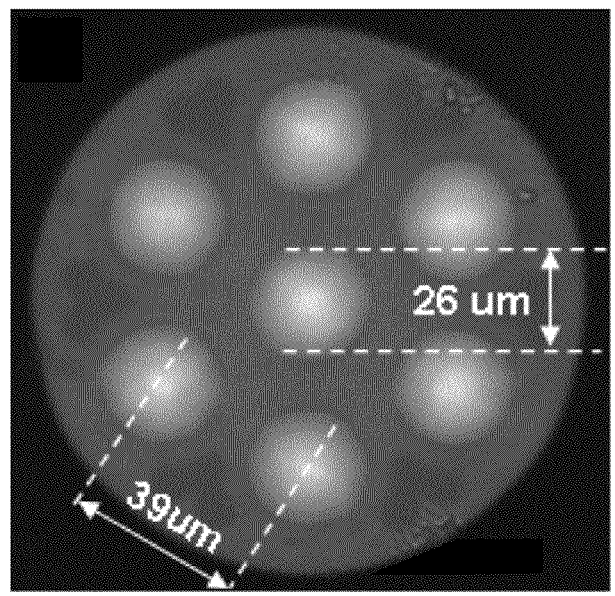
FIGS. 18A and 18B show, respectively, a cross section photograph and diagram of a graded-index multicore fiber according to a further aspect of the invention.
Figure 18B:
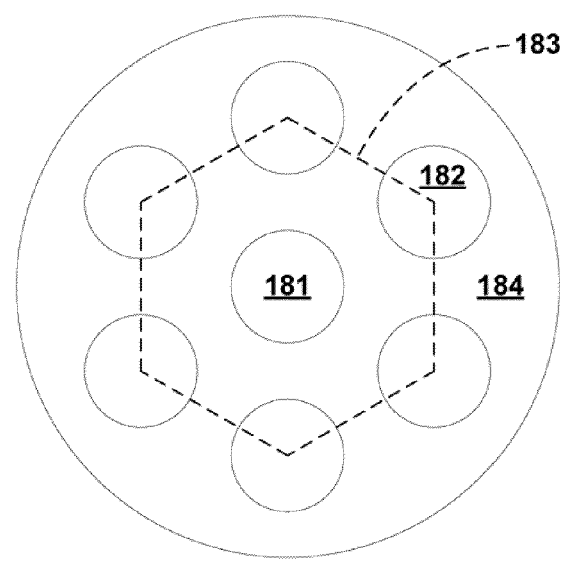

FIGS. 18A and 18B show, respectively, a cross section photograph and diagram of an MCF 180 according to an aspect of the invention. The MCF comprises seven cores arranged in a hexagonal array including a center core 181 and six outer cores 182 positioned at the vertices of a regular hexagon 183 in a common cladding 184. The diameter of each of the cores is 26 μm, and the core pitch is 39 μm. The cladding diameter is 125 μm and the acrylate dual coating layer (not shown) is 250 μm. These diameters are compatible with the diameters of conventional fiber. According to a practice of the invention, the described MCF is manufactured using a stack-and-draw process.

To achieve high-speed (>10 Gb/s) parallel multi-core fiber transmission, it is necessary for there to be little or no crosstalk between individual MCF cores to minimize interference between the distinct signals transmitted through each distinct core. In addition, an optimized design of a suitable graded index profile in each core, as well as precise control during the fabrication process, are essential to maintain uncompromised modal bandwidth, to precisely control the properties of the low-order and high-order modes, and to minimize or eliminate deformation. Furthermore, it is imperative that the refractive index profile and core rod properties be sufficiently robust that the MCF can be manufactured with high yield.

Even though the cores support multiple modes, the same design considerations as discussed above for single-mode cores may be employed for controlling crosstalk, spliceability and optical attenuation. However, the treatment must extend to all modes supported by the cores, or at least to the most problematic modes.

Figure 19:
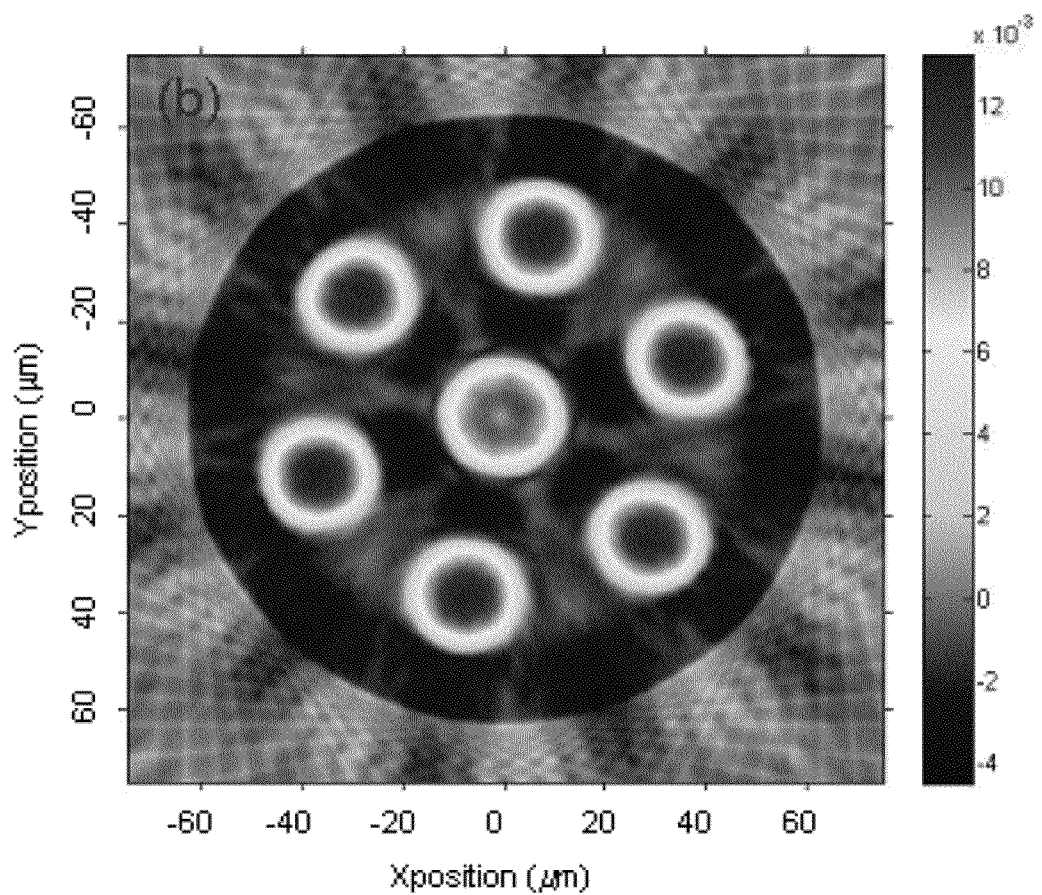
FIG. 19 shows a refractive index profile of the multicore fiber shown in FIGS. 18A and 18B, which was measured using a tomographic index profiler.

FIG. 19 shows a refractive index profile 190 of MCF 180, which was measured using a tomographic index profiler. The core index difference Δn is approximately 0.016. It can be seen from FIG. 19 that all seven cores are fairly circular and maintain an optimized graded-index profile design. The average transmission loss for the seven cores at 1310 nm is approximately 0.5 dB/km, which is typical of conventional graded-index fiber.

Optical crosstalk between adjacent signal-transmitting cores is an important issue in MCF transmission systems. The crosstalk characteristics of an MCF not only depend on fiber design considerations, such as index profile, geometric structure, and the like, but also on fiber length, bending properties, and the like. Optical crosstalk from the center core to adjacent outer cores can be measured by scanning the optical power intensity distributions at the output endface of the fiber.

Figure 20:
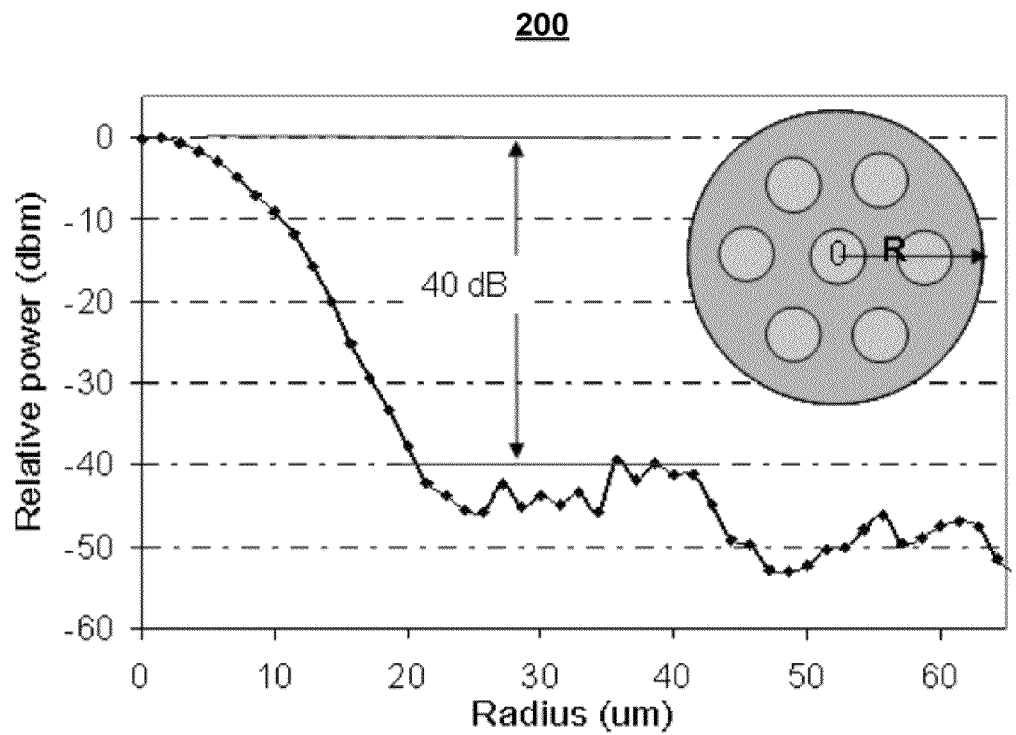
FIG. 20 shows a graph illustrating relative power vs. radius for crosstalk measurements for the multicore fiber shown in FIGS. 18A and 18B.

In one test, a 550 m length of fiber was wound onto a spool having a diameter of 17 cm, and the center core was excited by a multimode VCSEL operating at a wavelength of 850 nm. FIG. 20 is a graph 200 illustrating relative power $(P_{(r)})/P_c$ vs. radius for crosstalk measurements, where $P_c$ is the power measured at center core. The crosstalk of the six outer cores from the center core in the 550 m fiber were all measured to be all below −40 dB.

C. High-Speed Parallel Transmission

High-speed parallel transmission characteristics of the MCF are investigated by using a tapered mode coupler (TMC), which is used to couple the individual signals into and out of an MCF.

Figure 21:
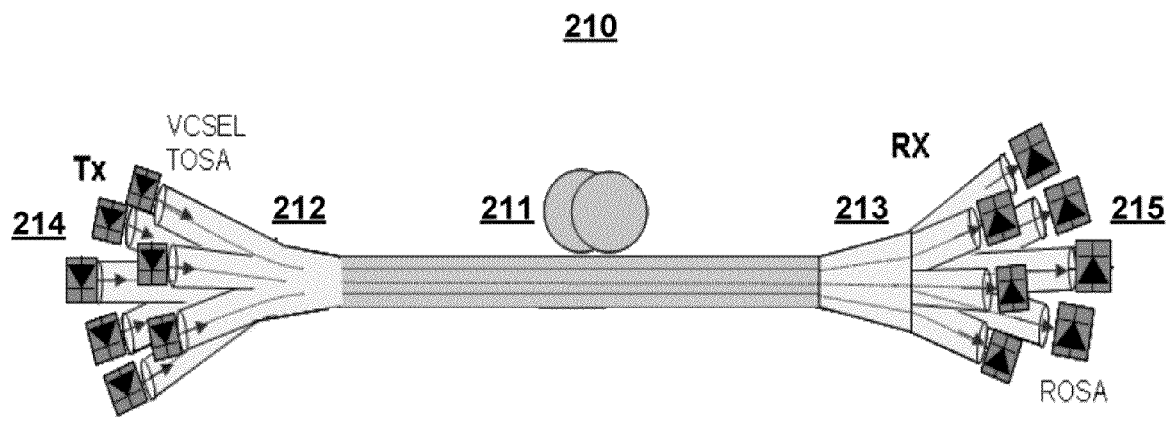
FIG. 21 illustrates a schematic diagram of an experimental setup used to investigate the high-speed parallel transmission characteristics of the multicore fiber shown in FIGS. 18A-18B and 19.

FIG. 21 illustrates a schematic diagram of an experimental setup 210 which was used to investigate the high-speed parallel transmission characteristics of a multicore fiber of the type described above. Setup 210 comprises the following components:

a 100 m length of MCF 211;

a first tapered multicore coupler 212 that is fusion-spliced to an upstream end of MCF 211;

a second tapered multicore coupler 213 that is fusion-spliced to a downstream end of MCF 211;

a transmitter optical subassembly (TOSAs) 214, comprising a plurality of individual vertical-cavity surface emitting lasers (VCSELs) connected to respective fiber leads into the first TMC 212; and a receiver optical subassemblies (ROSAs) 215, comprising a plurality of individual PiN detectors connected to respective leads out of the second TMC 213.

The core diameter and core pitch of the first and second TMCs 212, 213 are configured to match those of the MCF 211. Crosstalk between cores in TMC device is required to be below −25 dB. Also, insertion loss from the TMC must be as small as possible.

In one experiment, seven commercially available 850-nm 10 Gb/s VCSELs (TOSA) 214, pigtailed with 1 meter standard 50 μm multimode fiber (MMF), were connected to each pigtail fiber of the first TMC 212. All 7 channels operated at 10-Gbps with a non-return-to-zero (NRZ) 231-1 PRBS signal; the electrical 10-Gb/s signals were generated from a pattern generator, amplified, divided with different lengths of microwave cables, and fed into the VCSELs drivers. The averaged (modulated) optical power was approximately −0.5 dBm, the laser RMS line-width was approximately 0.35 nm, and the laser relative intensity noise (RIN) was −125 dB/Hz. For low cost, commercially available 850-nm GsAs PIN (ROSA) receivers 215 without clock and data recovery (CDR) circuits were used as the receivers with electrical bandwidth of about 7.5 GHz, and were connected by means of an approximately 1-meter segment of standard 50 μm MMF to each pigtail fiber of the second TMC 213.

For back-to-back transmission, the VCSEL transmitter was connected to the receiver using two 1-meter segments of standard 50 μm MMF and a tunable optical attenuator (matched to 50 μm multimode fiber). The receiver sensitivity (BER at $10^{-12}$) was approximately −6.5 dBm, and the rise and fall times (20%-80%) were typically 51.1 ps and 45.3 ps. The RMS time jitter was approximately 6.04 ps.

Figure 22:
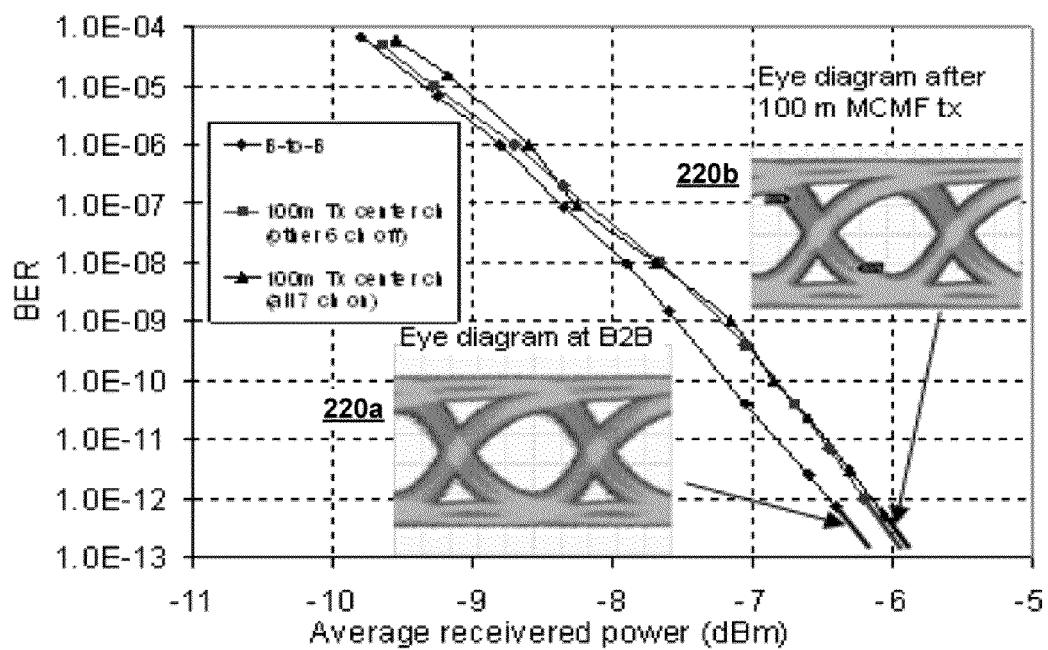
FIG. 22 is a graph 220 showing the performance of the center channel for back-to-back vs. 100 m multicore fiber transmission with center channel transmitted only, and with all seven channels transmitted.

FIG. 22 is a graph 220 showing the performance of the center channel for back-to-back vs. 100 m multi-core fiber transmission with center channel transmitted only, and with all 7 channels transmitted. The eye diagrams at back-to-back and after 100-m MCF transmission are shown, respectively, in insets 220a and 220b.

After 100 m MCF transmission, the rise and fall times were typically 52.4 and 49.1 ps, and the RMS time jitter was approximately 6.11 ps. The optical power penalty after MCF transmission was approximately 0.35 dB. It can be seen in FIG. 22 that there was virtually no penalty (within measurement accuracy) when all 7 channels operated simultaneously. This means that the crosstalk between the outer cores and the center core was very low, which is consistent with the data shown in FIG. 19. The relative high receiver sensitivity at back-to-back is due to the low-quality TOSA (VCSELs) and ROSA used, and the low-quality 10-Gb/s electrical signals resulting from the use of numerous amplifiers and divider circuits. Nevertheless, error-free operation was achieved in the experiment.

Figure 23:
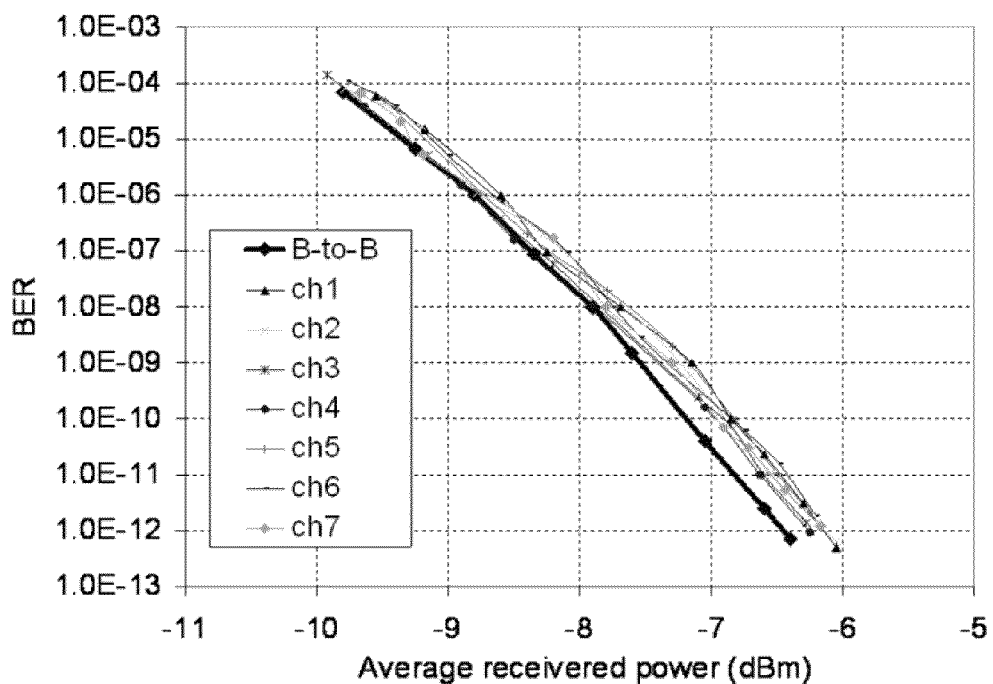
FIG. 23 is a graph showing the BER performance of all seven channels after 100 m MCF transmission, when all seven channels are operated simultaneously.

FIG. 23 is a graph 230 showing the BER performance of all 7 channels (cores) when all 7 channels are operated simultaneously, after 100 m MCF transmission. All 7 channels have similar BER performance with the similar receiver power sensitivity, within measurement accuracy. This result is consistent with the index-profile measurement data shown in FIG. 19, that all cores have similar index-profile. The averaged loss budget of the links, taken from the 7 channels, is approximately 2.8 dB. The majority of loss originates from the two TFB due to fabrication process imperfections. The budget is large enough to realize 7×10 Gb-ps parallel optical links.

It should be noted that the 10 Gb/s per core MCF transmission demonstrated in the experiment is limited by the speed of VCSEL and PIN detectors used in the experiment. The relative small core diameter (26 μm core diameter in MCF compared with 50/125 μm OM3 single-core multimode fiber), which means fewer optical modes in each core, and well-defined index profiles, indicate large bandwidth and small modal noise, potentially for high speed and longer distance transmission.

III. Conclusion

While the foregoing description includes details which will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

We claim:

1. A multicore fiber, comprising:
a plurality of cores extending along the length of a fiber body, wherein each of the cores is surrounded by a respective cladding, and wherein the plurality of cores and claddings provide respective index variations, so as to form a respective plurality of waveguides for conducting parallel data transmissions from a first end of the fiber to a second end,
wherein the plurality of cores has a cross-sectional geometry in which the plurality of cores are configured in a polygonal array, in which at least some of the cores are positioned at the vertices of the array,
wherein the polygonal array is configured such that neighboring cores in the array are separated from each other by a distance that is sufficient to prevent crosstalk therebetween, and
wherein the fiber body further includes
an intermediate region through which the plurality of cores and respective claddings extend,
a coating interface region surrounding the intermediate region, and
an outer coating surrounding the coating interface region,
wherein the intermediate region, coating interface region, and outer coating are configured to control the distribution of the optical modefield, thereby reducing loss.

2. The multicore fiber of claim 1,
wherein the fiber has an outer diameter that is substantially equal to that of a standard single-mode fiber.

3. The multicore fiber of claim 1,
wherein the polygonal array comprises a hexagonal shape, and wherein at least some of the cores are positioned at the vertices of the hexagonal shape.

4. The multicore fiber of claim 3,
wherein the polygonal array comprises a regular hexagonal shape.

5. The multicore fiber of claim 4,
wherein the plurality of cores comprises six cores,
wherein the six cores are positioned at the vertices of a regular hexagon.

6. The multicore fiber of claim 4,
wherein the plurality of cores comprises seven cores,
wherein six cores are positioned at the vertices of a regular hexagon, and
wherein one core is positioned at the center of the regular hexagon.

7. The multicore fiber of claim 4,
wherein the plurality of cores comprises nineteen cores,
wherein the cores are located within individual rods; and
wherein the rods are positioned to provide a minimal outer circumference.

8. The multicore fiber of claim 6,
wherein the plurality of cores comprises a plurality of single-mode cores.

9. The multicore fiber of claim 8, wherein the plurality of single-mode cores is configured for single-mode operation in wavelength regions including 1310 nm and 1490 nm.

10. The multicore fiber of claim 8, wherein the plurality of single-mode cores is configured for single-mode operation in a bandwidth window of 1490 to 1620 nm.

11. The multicore fiber of claim 8,
wherein each of the seven cores has a diameter between 6 µm and 10 µm,
wherein the core-to-core pitch is between 30 µm and 50 µm,
and wherein the core-clad difference is between 0.004 and 0.010.

12. The multicore fiber of claim 8,
wherein each of the seven cores has a Δn between 0.004 and 0.008 and is surrounded by a cladding region having a Δn between −0.0008 and −0.0040.

13. The multicore fiber of claim 6,
further including a trench for reducing crosstalk.

14. The multicore fiber of claim 6,
wherein the plurality of cores comprises a plurality of graded-index multimode cores.

15. The multicore fiber of claim 14,
wherein the plurality of graded-index multimode cores is configured for single-mode operation in wavelength regions including 1310 nm and 1490 nm.

16. The multicore fiber of claim 6,
wherein the plurality of cores comprises cores having a diameter between 15 µm an 32 µm and wherein the core-to-core pitch is between 35 µm and 45 µm.

17. The multicore fiber of claim 6,
wherein the core index difference is between 0.010 and 0.030.

18. The multicore fiber of claim 1, wherein the coating interface comprises a down-doped material that is configured to truncate the respective modefield distributions of each of the cores proximate to the outer coating, thereby minimizing overlap therebetween.

19. The multicore fiber of claim 1, wherein the distance between the plurality of cores and the coating interface is configured to minimize loss.

20. The multicore fiber of claim 19, wherein the intermediate region is doped to have a refractive index difference Δn of approximately −0.0012 relative to pure silica, so as to minimize evanescent field tails beyond the material of each core.

21. The multicore fiber of claim 1, wherein the outer coating is configured to have an index less than or equal to that of the cladding index.

* * * * *